Figure 4:
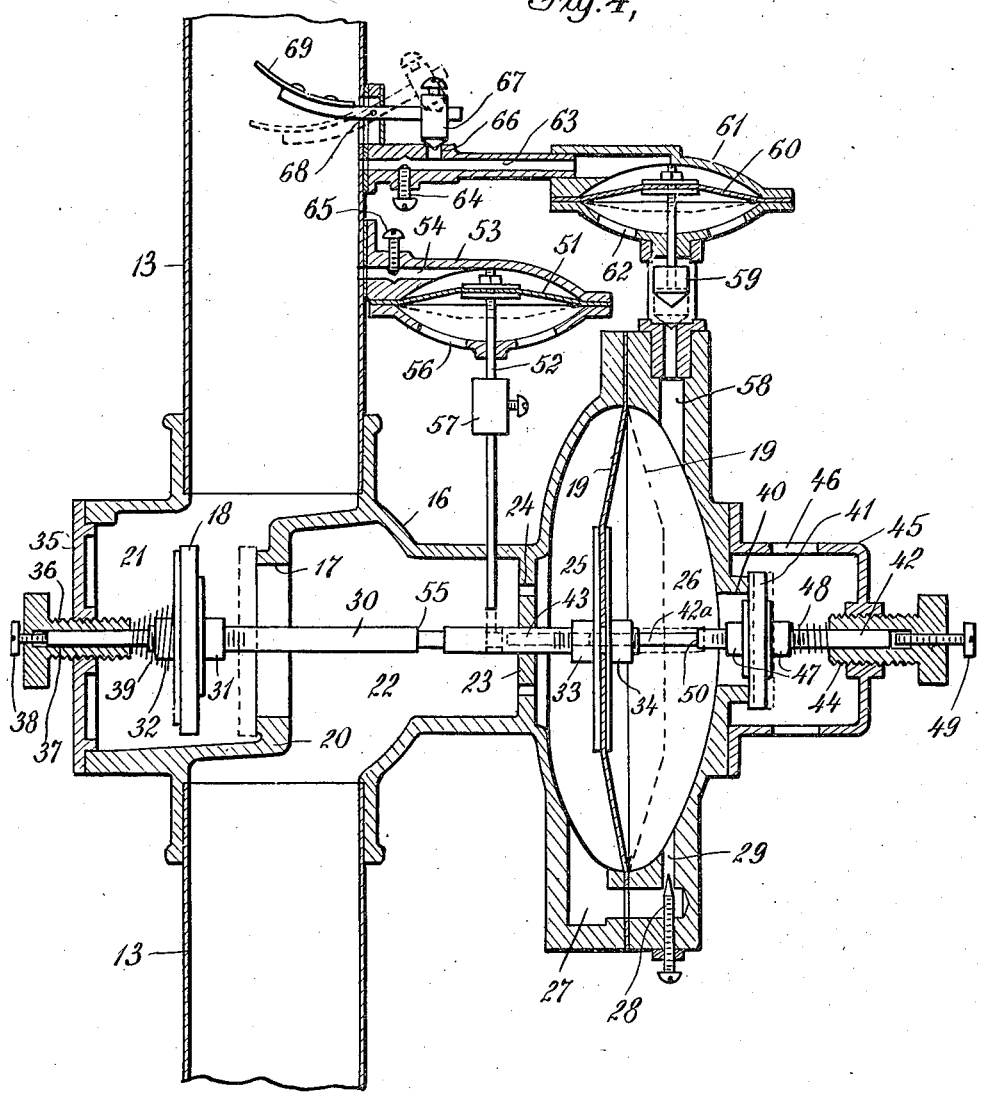

March 20, 1928.  1,663,031
E. WEIGELE
PNEUMATIC DISPATCH SYSTEM
Filed April 6, 1923  3 Sheets-Sheet 1
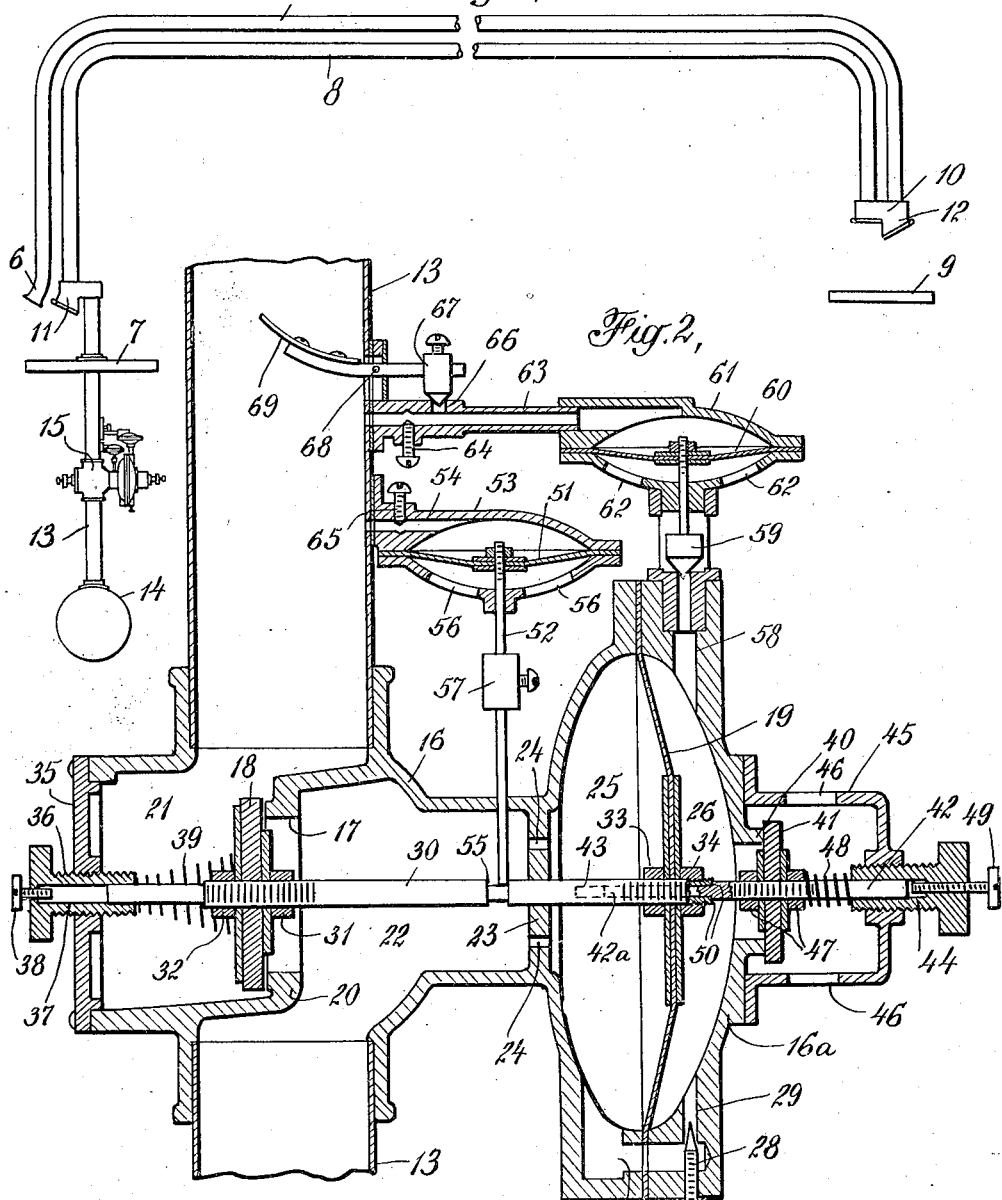
INVENTOR
Edmund Weigele
BY
ATTORNEYS

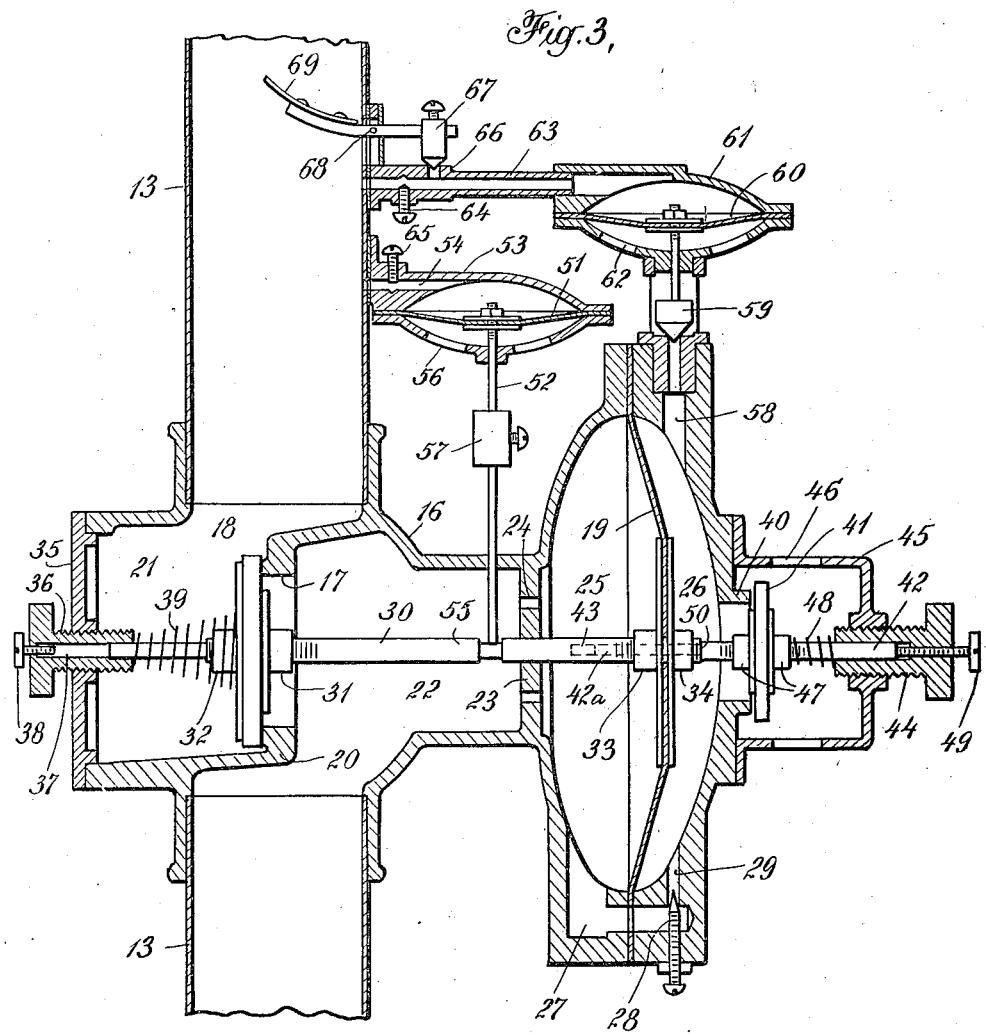

Patented Mar. 20, 1928.

1,663,031

UNITED STATES PATENT OFFICE.

EDMUND WEIGELE, OF BERGENFIELD, NEW JERSEY, ASSIGNOR TO ATLAS DEVICES COMPANY, INC., A CORPORATION OF NEW YORK.

PNEUMATIC DISPATCH SYSTEM.

Application filed April 6, 1923. Serial No. 630,215.

This invention relates to a method of operating pneumatic dispatch tube systems and apparatus therefor involving the control and regulation of the air-flow through the tube lines, both with respect to the air-flow required to propel a carrier through a tube line and when the lines are unoccupied by carriers, to reduce to a minimum the duty of vacuum or pressure producing means for the system, as the latter may be operated on one principle or the other, and to thus effect the greatest possible economy in the consumption of power.

The invention has reference more particularly to a method of operating pneumatic dispatch systems of the type wherein the tube lines are open and the exhaust or pressure devices work to maintain a slight vacuum in the line when unoccupied by carriers with a consequent small or partial flow of air through the line. In such systems, it has heretofore been the practice to equip the tube lines with valves or control devices which operate automatically to produce a full carrier-propelling flow of air when a carrier is inserted in a line and, by timing devices or automatically actuated arrangements, to cut down the air-flow to a partial flow upon discharge of the carrier from the line. The slight vacuum maintained in the open tube line, consequent upon which the partial flow of air takes place, is adjusted to an amount just sufficient to insure prompt operation of the control device and dispatch of the carrier upon its insertion in the line, and this partial flow of air is, of course, continuous. Obviously, the smaller the partial flow of air consistent with operating conditions, the greater will be the economy effected while the tube lines are empty.

The method of operation and apparatus provided by this invention effect a still greater saving in power than is possible by maintaining the partial continuous flow of air during periods of disuse of the tube lines by substituting for the partial continuous flow an intermittent or pulsating flow, by which method it is possible to maintain operating conditions with but a fractional percentage of the power heretofore consumed in maintaining a continuous partial flow. It is to be here noted that the principles of operation heretofore set forth may be applied to pressure systems, as well as systems of the vacuum type, the latter being selected as one application of the invention for the purpose of illustration.

The method of operation described is carried out by means of a control device which acts automatically to produce an intermittent or pulsating flow of air through the tube line to which it is fitted, while the line remains unoccupied by carriers. The device is constructed and arranged to respond to the pressure conditions in the line and by the provision and disposition of opposing forces to be actuated to produce the intermittent or pulsating flow of air through the tube line during periods of disuse. In one form of construction, a master valve is employed for controlling the flow of air through the tube line which is connected to a pressure responsive member. One side of the pressure responsive member has a valve controlled connection with the atmosphere tending to force the valve open and means are provided for exerting an opposing force tending to close the valve, with means for equalizing the pressure on both sides of the pressure responsive member. Thus, the application of an unbalanced force on one side of the pressure responsive member, a timed equalization of the pressure which may be made as rapid as desired, and a continuous application of an opposing force tending to close the valve, produces an oscillatory opening and closing movement of the valve breaking and establishing communication between the transit tube and the suction means with a resultant pulsating or intermittent flow. Adjustments are provided by which the extent of the opening and closing movement or oscillation of the valve may be regulated. Such adjustments are arranged to make it possible, also, to set the limits of oscillation of the valve between a slightly open position and a greater opening to produce a continuous but fluctuating flow of air through the tube line.

Irrespective of the details of construction of the control device employed, the device may be constructed and arranged to operate upon the insertion of a carrier in the tube line to initiate a carrier-propelling flow of air and to automatically reduce this flow to an intermittent pulsating flow upon discharge of the carrier from the line, and to maintain this flow while the line remains unoccupied by carriers. Where such operation is combined with the regulation of air-flow through the tube line, while a carrier is in transit as set forth in the application filed jointly by myself and William H. Dinspel on August 12, 1920, Serial No. 403,017 (now Patent No. 1,470,600, issued Oct. 16, 1923), an extremely efficient and economical method of operating pneumatic dispatch systems is realized.

The control device is preferably of the globe valve type, adapted to be fitted in the suction tube between the transit tube and the exhaust means, embodying the details of construction disclosed in the illustrative form of control device set forth and described in detail in the said joint application of myself and William H. Dinspel.

The preferred embodiment of the invention is illustrated in the accompanying drawings, in which Fig. 1 is a diagrammatic representation of a tube line consisting of a sending tube and a return tube with connection to a suction drum through a suction tube, in which the control device is situated;

Fig. 2 is a sectional view of the control device showing the valve in a slightly open position and the corresponding positions of the other operating parts;

Fig. 3 is a sectional view of the control device showing the closed position of the valve and corresponding positions of the other operating parts, and Fig. 4 is a sectional view of the device showing the wide open position of the valve and corresponding positions of the other operating parts, and the valve closed and the position of the remaining parts dotted to indicate the temporary closing action while the carrier is in transit through the line.

The pneumatic dispatch system illustrated diagrammatically in Fig. 1 consists of the usual sending tube 5 having an open end or bell mouth 6, say at the central station 7, and a return tube 8 as from an outlying station 9, the tube lines being connected together to form a continuous passage for air by the fitting 10, and having discharge terminals 11 and 12 at the central and outlying stations respectively. The sending and return tubes 5 and 8, representing one complete transit tube or line of a system, is connected by means of a suction tube 13 with a suction drum 14 from which air is evacuated by the usual pump. Situated in the suction tube 13 is a regulating device 15 which automatically controls and regulates the suction exerted on the tube line and the consequent air flow through the line by action of the suction drum 14.

The regulating device 15 illustrated in section and in detail in Figs. 2, 3 and 4 is of the globe valve type, having a casing 16 in which there is an internal opening 17 providing communication between the suction means and the transit tube through the suction tube 13 and which provides a housing for the master valve 18, the diaphragm 19 and the operating parts associated with the valve and diaphragm. The partition 20 within the casing 16 in which the opening 17 is located divides the casing into a chamber 21, in communication with the upper part of the suction tube 13, and a chamber 22, in communication with the lower part of the suction tube and with the suction drum 14. Another partition 23 divides that portion of the casing 16 in which the main diaphragm 19 is located from the portion housing the main valve, and has ports 24 by which the chamber 25 on one side of the diaphragm 19 communicates with the lower portion of the suction tube 13 and with the suction drum 14. The main diaphragm 19 divides that portion of the casing 16 in which it is housed into two chambers, one of which is the chamber 25 just mentioned, on the inner side of the diaphragm, and the chamber 26 on the outer side thereof. The chambers 25 and 26 are in communication through the bleeder passage 27, the air flow through which is controlled by a needle valve 28 adapted to enter a constricted portion 29 of the bleeder passage. The master valve 18 and the main diaphragm 19 are connected together by means of a connecting rod 30, the ends of which are threaded to receive a nut 31 and a lock nut 32 for adjusting the position of the master valve 18 on the connecting rod and securing it in adjusted position; and the nut 33 and lock nut 34 on the opposite end of the connecting rod for adjusting the position of the main diaphragm 19 thereon and locking it in adjusted position. In the side wall 35 of the casing 16 is a screw plug 36 having an inner bore 37 which provides a bearing for that end of the connecting rod which carries the master valve 18, and the extent of movement of the connecting rod outwardly as the master valve opens may be adjusted by a screw 38 entering the bore 37. The end of the screw plug 36 provides an abutment for one end of a spring 39, the other end of which bears against the master valve 18, tending to force the valve to a closed position. The tension of this spring 39 may be regulated by adjusting the screw plug 36. The diaphragm housing portion 16ª of the casing 16 has an opening 40 which is adapted to be closed by a secondary valve 41. The secondary valve is mounted on a rod 42, one end 42ª of which enters a bore 43 in the diaphragm end of the connecting rod 30 in telescoped relation, and the other end of which moves in a bearing provided by a screw plug 44 which enters a casing 45 housing the secondary valve and its associated parts. The casing 45 has openings 46 to the atmosphere. Like the master valve and main diaphragm, the secondary valve 41 is adjustable on the rod 42 by means of nuts 47 and fixed in position by these nuts. Between the end of the screw plug 44 and the secondary valve is a spring 48 tending to force the secondary valve to a closed position. The movement of the rod 42 outwardly, as when the master valve 18 moves to its closed position, is limited by an adjusting screw 49, for during such movement the connecting rod 30 bears against the shoulder 50 provided in the secondary valve rod 42, and the movement of one is therefore communicated to the other. The reverse is true when the secondary valve 41 is urged to its closed position, when the movement of the rod 42 is communicated through the shoulder 50 to the connecting rod 30 to open the valve 18.

The operation of so much of the control and regulating device as has been so far described is as follows: When the tube line is unoccupied by carriers, the suction drum 14 through the suction tube 13 tends to produce a flow of air through the tube line entering at the open end 6 thereof. This flow of air is controlled and regulated by the control device 15 and more particularly by the master valve 18 under action of its associated parts. When the line is empty, the chambers 25 and 26 are in communication through the bleeder passage 27 and the ports 24 with the lower part of the suction tube 13 and the suction drum 14. The pressure on both sides of the main diaphragm is therefore equal and the spring 39 furnishes an unbalanced force tending to seat the master valve 18 over the opening 17. As the master valve 18 moves to its closed position, the end of the connecting rod 30 abuts against the shoulder 50 of the rod 42 and the various adjustments can be so arranged that the instant the master valve 18 closes the opening 17, the secondary valve 41 is unseated and slightly opened by outward movement of the rod 42 as illustrated in Fig. 3. This opening of the secondary valve 41 admits atmospheric air through the opening 40 into the chamber 26 on one side of the main diaphragm 19 producing a momentary unbalanced force sufficient to overcome the force exerted by the spring 39 and the main diaphragm moves to the left. This movement of the diaphragm is communicated to the master valve 18 through the connecting rod 30 and the master valve is again slightly opened, the extent of which depends upon the adjustments made. As soon as the main diaphragm 19 moves over under impulse of the unbalanced force and the abutting ends of connecting rods 30 and rod 42 separated, the spring 48 closes the secondary valve 41, thus cutting off the admission of air into the chamber 26. As the diaphragm 19 moves over to open the master valve 18 the atmospheric air trapped in the chamber 26 flows through the bleeder passage 27 into the opposite chamber 25, balancing the pressures on both sides of the diaphragm. These chambers 25 and 26 being then in communication only with the suction tube 13 and the suction drum are promptly evacuated, maintaining the equalized pressure, this time reduced to a vacuum, and permitting the spring 39 to again act to overcome any opposing forces to seat the master valve 18. This completes the cycle of operation while the tube line remains unoccupied by carriers, and it will be seen that the operation results in an oscillatory opening and closing of the master valve 18 which breaks and establishes communication between the suction drum and the transit tube, producing an intermittent pulsating flow of air. The rapidity of the pulsations may of course obviously be regulated by adjustment of the parts as well as the volume of air taken in at each impulse by varying the extent of opening when the valve is urged to the limit of its outer oscillatory movement. Moreover, it will be seen that by proper adjustment the master valve 18 may be oscillated between a slightly open or unseated position to a more open position to produce a small fluctuating but continuous flow of air through the tube line when empty.

In order to provide a check on the extreme positions of the master valve 18, a secondary diaphragm 51 is provided which is connected to one end of a rod 52 and is housed in a casing 53 in communication through a passage 54 with the suction tube 13. The opposite end of the rod 52 enters a reduced portion 55 of the connecting rod 30. The casing 53 is provided with openings 56 to the atmosphere on the under side of the diaphragm 51, and in the normal position of the secondary diaphragm the end of the rod 52 rests in the reduced portion 55, thus setting a limit on the extreme positions of the master valve 18 as will be seen. The rod 52 may be provided with an adjustable weight 57 to insure proper positioning of the end of the rod in the reduced portion 55.

Proceeding to a description of the remaining portions of the regulating device, the diaphragm casing 16ª is provided with a port 58 to the atmosphere which is controlled by an auxiliary valve 59. This auxiliary valve is connected to an auxiliary diaphragm 60 housed in a casing 61 which has openings 62 to the atmosphere on the under side of the auxiliary diaphragm. The casing 61 is connected to the suction tube through a passage 63, the extent of opening of which is controlled by a small adjusting screw 64. In a similar manner the opening of the passage 64 of the secondary diaphragm casing 53 is controlled by an adjusting screw 65.

When a carrier is inserted in the end of the tube line communication between the atmosphere and the suction drum 14 through the system is interrupted, and the vacuum in the line immediately becomes greater, or, in other words, the pressure is reduced. This reduced pressure effects a reduction in pressure on the upper side of the auxiliary diaphragm 60 through the passage 63 and atmospheric pressure on the under side of the diaphragm through the opening 62 causes this diaphragm to rise and to move the auxiliary valve 59 off its seat. Atmospheric air rushes into the chamber 26 through the port 58 and creates an unbalanced force which moves the valve 18 to its extreme open position, as indicated in Fig. 4, which is limited by the adjustment of the screw 38. This provides a carrier propelling flow of air through the tube line for the transmission of the carrier. The reduction of pressure in the line attendant upon the insertion of a carrier also effects the raising of the secondary diaphragm 51 and simultaneously with the raising of the auxiliary diaphragm 60, the rod 52 is raised above the connecting rod 30, permitting its outward movement opening the valve. The position of the master valve and the corresponding positions of the operating parts indicated with the valve wide open are shown in Fig. 4 in full lines.

The full carrier propelling flow of air thus produced is not required for the propulsion of the carrier through short lines, nor through long lines where, as in almost every case, descending grades are encountered. In fact where the carrier propelling flow is maintained undiminished under these conditions, the carrier is caused to race in the line, causing injury to the tube lines and to the carriers themselves as when rounding bends at high velocity, besides causing a waste of power through a continued exertion of a needless propelling force. As in the regulating device set forth and described in the joint application of myself and William H. Dinspel heretofore referred to, the device is equipped with means actuated by the kinetic energy of the air flow above a predetermined rate to cut off the propelling flow and reduce the flow to a partial or fractional flow or, in this case, an intermittent or pulsating flow. This is accomplished by providing a port 66 in the passage 63 of the auxiliary diaphragm casing controlled by a regulating valve 67. This regulating valve is adjustable on one end of a lever centrally fulcrumed at 68, the end of which carries a blade or vane 69 projecting into the suction tube 13. The area of this blade or vane 69 and the weight of the valve 67 and its position on the lever are adjusted so that at a predetermined velocity of air produced by an excessive speed of the carrier, or by the increased velocity of air attendant upon discharge of the carrier from the tube line, the lever will be depressed as shown in dotted position in Fig. 4, raising the valve 67 and opening the port 66. This admits atmospheric air into the passage 63, resulting in the depression of the auxiliary diaphragm 60 as shown in dotted line, and the closing of the port 58 by seating of the auxiliary valve 59. The chamber 26 being cut off from the atmosphere, the pressures in this chamber and the opposite chamber 25 are equalized through the bleeder passage 27 and the spring 39 forces the valve 18 to its closed position. The valve is held closed until the carrier reaches an ascending grade in the tube line when the pressure in the line between the carrier and the suction drum is again reduced, actuating the auxiliary diaphragm 60 and opening the chamber 26 to the atmosphere with resultant opening of the valve 18 to again establish a carrier propelling flow. When the carrier discharges from the tube line a rush of air takes place in the suction tube 13, acting on the blade or vane 69 and causing the regulator valve 67 to swing open when the master valve 18 is again brought to its closed position as described. Following this the oscillation of the valve 18 again takes place, producing the intermittent pulsating flow of air through the line while the latter remains unoccupied by carriers.

I claim:—

1. The method of operating pneumatic dispatch systems wherein a tube line is used for the transmission of carriers, which consists in initiating a carrier-propelling flow of air upon insertion of a carrier in the line, and maintaining an intermittent flow through the line when the latter is unoccupied by carriers; substantially as described.

2. The method of operating pneumatic dispatch systems wherein a tube line is used for the transmission of carriers, which consists in initiating a carrier-propelling flow of air upon insertion of a carrier in the line, and maintaining an intermittent reduced flow through the line when the latter is unoccupied by carriers; substantially as described.

3. The method of operating pneumatic dispatch systems wherein a tube line is used for the transmission of carriers, which consists in initiating a carrier-propelling flow of air upon insertion of a carrier in the line, and establishing, upon discharge of the carrier, and maintaining, while the line remains unoccupied by carriers, an intermittent reduced flow; substantially as described.

4. The method of operating pneumatic dispatch systems wherein a tube line is used for the transmission of carriers, which consists in initiating a carrier-propelling flow of air upon insertion of the carrier in the line, regulating the flow of air while the carrier is in transit, and maintaining an intermittent flow when the line is unoccupied by carriers; substantially as described.

5. The method of operating pneumatic dispatch systems wherein a tube line is used for the transmission of carriers, which consists in initiating a carrier-propelling flow of air upon insertion of the carrier in the line, regulating the flow while the carrier is in transit, and establishing, upon discharge of the carrier and maintaining, while the line remains unoccupied by carriers, a reduced intermittent flow; substantially as described.

6. In a pneumatic dispatch system, a device which is adapted to be actuated, upon insertion of a carrier in the line, to secure a carrier-propelling flow of air, and means associated with said device for regulating the flow while the carrier is in transit through the line, said device being constructed and arranged to reduce the flow upon discharge of the carrier, to an intermittent pulsating flow and to maintain said flow while the line remains unoccupied.

7. In a pneumatic dispatch system, a tube line, a valve for controlling the flow of air through the line, and a pressure responsive member connected to the valve, said pressure responsive member being constructed and arranged to respond to intermittent and alternately applied opposing forces for securing an intermittent, pulsating flow of air in the line when unoccupied by carriers; substantially as described.

8. In a pneumatic dispatch system, a tube line, a valve in said tube line for controlling the flow of air therethrough, and a pressure responsive member connected to the valve, said pressure responsive member being constructed and arranged to be actuated to open the valve upon insertion of a carrier in the line, and to respond to intermittent and alternately applied opposing forces for securing an intermittent pulsating flow of air in the line when unoccupied by carriers; substantially as described.

9. In a pneumatic dispatch system, a tube line, a valve for controlling the flow of air through the line and a pressure responsive member connected to the valve, said pressure responsive member being constructed and arranged to be actuated upon insertion of a carrier to initiate a carrier-propelling flow through the tube line when a carrier is inserted, and to respond to intermittent and alternately applied opposing forces, to reduce the flow of air to a small intermittent, pulsating flow in the line upon discharge of carriers; substantially as described.

10. In a pneumatic dispatch system, a tube line, a valve for controlling the flow of air through the line, a pressure responsive member connected to the valve, and which is constructed and arranged to be actuated, upon insertion of a carrier, to initiate a carrier-propelling flow of air through the tube line when a carrier is inserted, and to respond to intermittent and alternately applied opposing forces to reduce the flow of air to a small, intermittent, pulsating flow in the line upon discharge of carriers therefrom, and means for regulating the flow of air while the carrier is in transit therethrough; substantially as described.

11. In a pneumatic dispatch system, a tube line, a valve in the tube line, a pressure responsive member connected to the valve in communication with the tube line and having a valve controlled connection with the atmosphere, means for subjecting one side of the pressure responsive member intermittently to the pressure of the atmosphere and means for exerting an intermittent force alternating with the pressure of the atmosphere to oscillate the valve and to thereby produce an intermittent pulsating flow of air through the line when unoccupied by carriers; substantially as described.

12. In a pneumatic dispatch system, a tube line, a valve in the tube line, a pressure responsive member connected to the valve in communication with the tube line, and having a valve controlled connection with the atmosphere, means for subjecting one side of the pressure responsive member to atmospheric pressure tending to open the valve, means for exerting an opposing force tending to close the valve, and means for equalizing the pressure on both sides of the pressure responsive member whereby to produce an intermittent opening and closing of the valve; substantially as described.

13. In a pneumatic dispatch system, a tube line, a valve in the tube line, a pressure responsive member connected to the valve in communication with the tube line having a valve controlled connection with the atmosphere, means for subjecting one side of the pressure responsive member to atmospheric pressure tending to open the valve, means for exerting an opposing force tending to close the valve, and means for equalizing pressure on both sides of the pressure responsive member whereby to produce an oscillatory opening and closing movement of the valve.

14. In a pneumatic dispatch system, a tube line, a valve in the tube line, a pressure responsive member connected to the valve in communication to the tube line, and having a valve controlled connection with the atmosphere, means for subjecting one side of the pressure responsive member to atmospheric pressure tending to open the valve, means for exerting an opposing force tending to close the valve, means for equalizing pressure on both sides of the pressure responsive member whereby to produce an oscillatory opening and closing movement of the valve, and means for adjusting the extent of the oscillatory movement of the valve; substantially as described.

15. In a pneumatic dispatch system, a tube line, a master valve in the tube line, a casing, a diaphragm in said casing connected to the master valve, a secondary valve for admitting atmospheric air to one side of the diaphragm, a spring tending to close the master valve, means for adjusting the tension of said spring, means for adjusting the extent of opening of the valve both to produce an intermittent pulsating flow and a carrier-propelling flow, a bleeder for equalizing pressure on both sides of the diaphragm, and a timing screw for said bleeder; substantially as described.

In testimony whereof I affix my signature.

EDMUND WEIGELE.